US009414386B2

(12) United States Patent
Khawer et al.

(10) Patent No.: US 9,414,386 B2
(45) Date of Patent: Aug. 9, 2016

(54) SELECTIVE ACTIVATION AND DEACTIVATION OF CARRIERS IN UNLICENSED FREQUENCY BANDS

(71) Applicant: Alcatel-Lucent USA Inc., Murray Hill, NJ (US)

(72) Inventors: Mohammad R. Khawer, Lake Hopatcong, NJ (US); Teck H. Hu, Melbourne, FL (US); Dandan Wang, New Providence, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 14/561,029

(22) Filed: Dec. 4, 2014

(65) Prior Publication Data

US 2016/0165604 A1 Jun. 9, 2016

(51) Int. Cl.
*H04M 1/00* (2006.01)
*H04W 72/04* (2009.01)
*H04W 16/14* (2009.01)
*H04W 24/02* (2009.01)
*H04W 72/12* (2009.01)

(52) U.S. Cl.
CPC .......... *H04W 72/0453* (2013.01); *H04W 16/14* (2013.01); *H04W 24/02* (2013.01); *H04W 72/1215* (2013.01)

(58) Field of Classification Search
CPC . H04W 16/14; H04W 72/0453; H04W 84/12; H04W 24/10; H04W 72/04; H04W 74/0808; H04W 28/085; H04W 52/243; H04W 72/0406; H04W 72/1215; H04W 88/06; H04W 24/02
USPC ................ 455/434, 443, 448, 454, 525, 63.1, 455/63.2, 67.13, 69, 552.1, 553.1, 343.2; 370/311, 318, 328, 329
See application file for complete search history.

(56) References Cited

U.S. PATENT DOCUMENTS

| | | | |
|---|---|---|---|
| 2008/0205365 A1* | 8/2008 | Russell | H04W 88/06 370/341 |
| 2009/0258649 A1* | 10/2009 | Salowey | H04W 4/02 455/435.2 |
| 2012/0213162 A1 | 8/2012 | Koo et al. | |
| 2014/0328271 A1* | 11/2014 | Chen | H04W 72/1215 370/329 |
| 2014/0328318 A1 | 11/2014 | Sundararajan et al. | |
| 2015/0146656 A1* | 5/2015 | Sun | H04W 16/16 370/329 |
| 2015/0195849 A1* | 7/2015 | Bashar | H04W 72/1215 370/330 |
| 2015/0208253 A1* | 7/2015 | Kim | H04W 24/02 370/252 |

FOREIGN PATENT DOCUMENTS

WO 2012/103177 A1 8/2012

OTHER PUBLICATIONS

"Medium Access Control (MAC) Protocol Specification", 3GPP TS 36.321 V12.3.0, Section 6.1.3.8, Sep. 23, 2014, 1 page.
International Search Report and Written Opinion correlating to PCT/US15/063066 dated Mar. 23, 2016, 11 pages.

* cited by examiner

*Primary Examiner* — Olumide T Ajibade Akonai
(74) *Attorney, Agent, or Firm* — Davidson Sheehan LLP

(57) ABSTRACT

An apparatus, such as user equipment, includes a first radio for wireless communication over a first carrier in an unlicensed frequency band according to a first radio access technology and a second radio for wireless communication over a second carrier in the unlicensed frequency band according to a second radio access technology. The apparatus also includes a device connection manager to deactivate the first carrier in response to detecting an access point that operates according to the second radio access technology in the unlicensed frequency band.

22 Claims, 5 Drawing Sheets

SELECTIVE ACTIVATION AND DEACTIVATION OF CARRIERS IN UNLICENSED FREQUENCY BANDS

BACKGROUND

1. Field of the Disclosure

The present disclosure relates generally to wireless communication and, more particularly, to wireless communication in unlicensed frequency bands.

2. Description of the Related Art

Unlicensed frequency bands are portions of the radiofrequency spectrum that do not require a license for use and may therefore be used by any device to transmit or receive radio frequency signals. For example, the Unlicensed National Information Infrastructure (UNII) is formed of portions of the radio spectrum that include frequency bands in the range of 5.15 GHz to 5.825 GHz such as the U-NII-1 band in the range 5.15-5.25 GHz, the U-NII 2a, b, c bands in the range 5.25-5.725 GHz, and the U-NII 3 band in the range 5.725-5.825 GHz. Unlicensed frequency bands can be contrasted to licensed frequency bands that are licensed to a particular service provider and may only be used for wireless communication that is authorized by the service provider.

Wireless communication devices that transmit or receive signals in licensed or unlicensed frequency bands are typically referred to as nodes, which may communicate according to different radio access technologies that are defined by different standards. For example, nodes may include Wi-Fi access points that operate according to IEEE 802.11 standards in the unlicensed spectrum. For another example, nodes may include base stations that operate in licensed spectrum according to standards such as Long Term Evolution (LTE) standards defined by the Third Generation Partnership Project (3GPP).

Base stations that operate according to LTE may implement supplemental downlink (SDL) channels in the unlicensed spectrum to provide additional bandwidth for downlink communications to user equipment that are also communicating with the base station using channels in a licensed frequency band. For example, one or more primary LTE carriers are anchored in the licensed spectrum and may be aggregated with one or more secondary LTE carriers in the unlicensed spectrum when the base station and one or more user equipment operate in a carrier aggregation mode. Wi-Fi access points also use unlicensed spectrum for wireless communication.

In order to take advantage of the bandwidth provided in the licensed spectrum and the unlicensed spectrum, user equipment can implement multiple radios for concurrent access to interfaces in the licensed frequency bands and the unlicensed frequency bands according to different radio access technologies. For example, user equipment may implement a radio to support an LTE interface in the licensed spectrum (LTE-L), a radio to support an LTE interface in the unlicensed spectrum (LTE-U), and a radio to support a Wi-Fi interface in the unlicensed spectrum. The different radios must be sufficiently isolated from each other to prevent collisions of transmitted or received signals. For example, a typical Wi-Fi transmit power of a smart phone is approximately 18 dBm and the in-band blocking requirement for LTE is −30 dBm, which implies that the Wi-Fi transmitter and the LTE receiver must be isolated from each other by at least 48 dBm. Frequency separation can provide sufficient isolation between the licensed frequency bands and the unlicensed frequency bands. However, there is no guarantee that signals transmitted by different nodes in the unlicensed frequency bands will be isolated from each other by frequency separation.

SUMMARY OF EMBODIMENTS

The following presents a simplified summary of the disclosed subject matter in order to provide a basic understanding of some aspects of the disclosed subject matter. This summary is not an exhaustive overview of the disclosed subject matter. It is not intended to identify key or critical elements of the disclosed subject matter or to delineate the scope of the disclosed subject matter. Its sole purpose is to present some concepts in a simplified form as a prelude to the more detailed description that is discussed later.

In some embodiments, an apparatus is provided for selective activation and deactivation of carriers in unlicensed frequency bands. The apparatus includes a first radio for wireless communication over a first carrier in an unlicensed frequency band according to a first radio access technology and a second radio for wireless communication over a second carrier in the unlicensed frequency band according to a second radio access technology. The apparatus also includes a device connection manager to deactivate the first carrier in response to detecting an access point that operates in the unlicensed frequency band according to the second radio access technology.

In some embodiments, a method is provided for selective activation and deactivation of carriers in unlicensed frequency bands. The method includes deactivating a first carrier used by a first radio in user equipment for wireless communication in an unlicensed frequency band according to a first radio access technology in response to detecting an access point that operates according to a second radio access technology used by a second radio in the user equipment for wireless communication in the unlicensed frequency band.

In some embodiments, an apparatus is provided for bypassing or resuming transmission on selectively activated or deactivated carriers in unlicensed frequency bands. The apparatus includes a transceiver to receive a notification transmitted by user equipment in a licensed frequency band according to a first radio access technology. The notification indicates that the user equipment is deactivating a carrier for receiving downlink signals in an unlicensed frequency band according to the first radio access technology. The apparatus also includes a processor to bypass transmission of downlink signals to the user equipment on the carrier in the unlicensed frequency band in response to receiving the notification.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
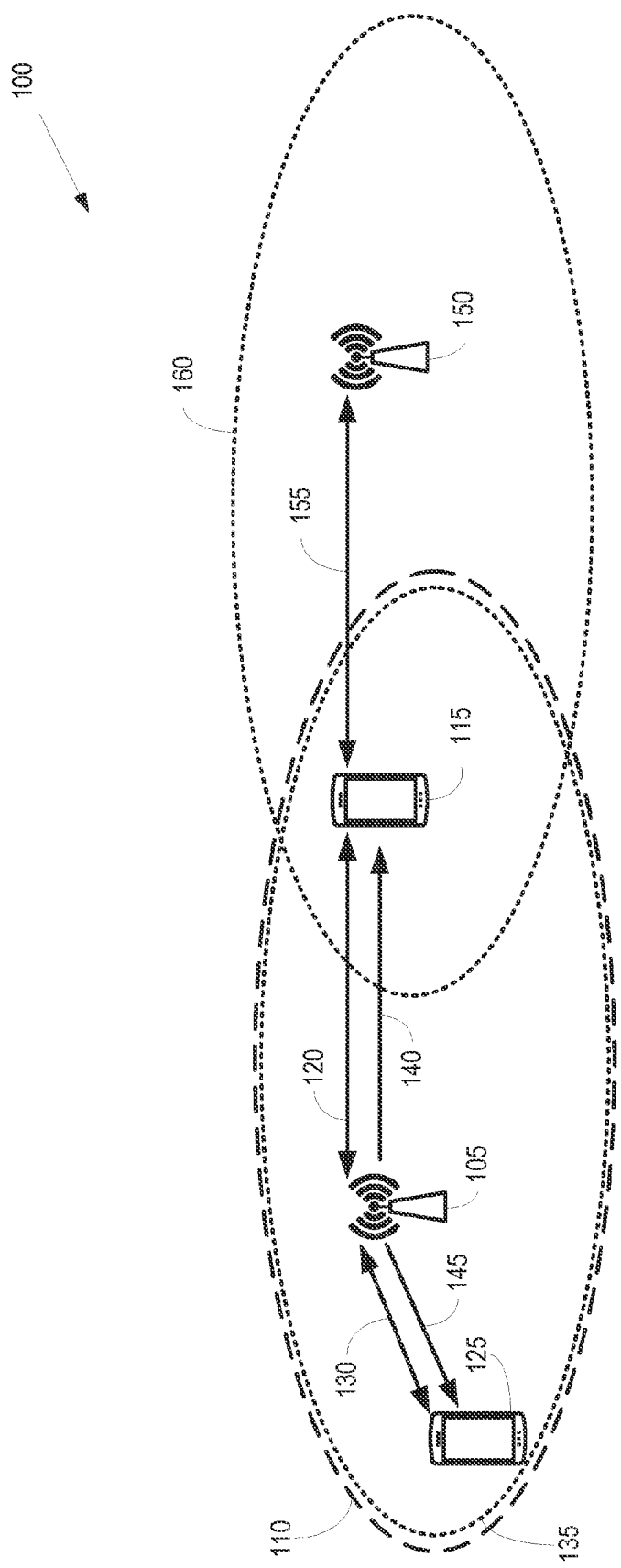
FIG. 1 is a diagram of a wireless communication system according to some embodiments.

Isolation between unlicensed frequency bands used by different radios in user equipment may be provided by coordinating the operation of different nodes associated with the user equipment to provide frequency separation. For example, a small cell that communicates with user equipment in the unlicensed frequency band using both Wi-Fi and LTE-U may be configured to provide Wi-Fi access to the user equipment at 2.4 GHz and LTE-U access at 5 GHz. For another example, the small cell may be configured to provide Wi-Fi access to the user equipment in lower frequency U-NII bands (such as U-NII 1 or U-NII 2a) and LTE access in higher frequency U-NII bands (such as U-NII 2c or U-NII 3). However, it may be difficult or impossible to coordinate enterprise and home Wi-Fi deployments by different vendors to ensure that Wi-Fi and LTE-U are exclusively provided to user equipment in separated frequency bands. Isolation may also be provided by implementing a frequency duplexer in the user equipment to support concurrent Wi-Fi and LTE-U operation in the same frequency band using frequency division multiplexing, but the cost of the frequency duplexer and associated filters may be prohibitive. Time division multiplexing could also be used but would entail a significant increase in the operational complexity of the user equipment, base stations, and access points.

The constraints imposed by the frequency isolation requirement on communication in an unlicensed frequency band by multiple radios of a user equipment may be removed by selectively disabling a radio that receives signals in the unlicensed frequency band in response to detecting signals intended for another radio in an overlapping portion of the unlicensed frequency band. Some embodiments of the user equipment include a device connection manager that can determine when two different radio access technologies are operating in the same unlicensed frequency band, and then selectively disable a first radio in the user equipment in response to detecting signals intended for a second radio in the user equipment. For example, the first radio may operate in the unlicensed frequency band according to a first radio access technology such as LTE and the second radio may operate in an overlapping portion of the unlicensed frequency band according to a second radio access technology such as Wi-Fi. The device connection manager may selectively disable the first radio in response to a user registering the user equipment for Wi-Fi communication with a Wi-Fi access point or in response to detecting the presence of a previously registered Wi-Fi access point. The user equipment may then transmit a message over a primary LTE carrier in a licensed frequency band to the base station to request or indicate deactivation of the secondary unlicensed LTE carrier (LTE-U) because communication according to the first radio access technology in the unlicensed spectrum has been deactivated on the user equipment.

The device connection manager may power down the radio associated with LTE-U to ensure that the Wi-Fi operation is not impacted by the LTE-U radio interference that operates in the same unlicensed frequency band. The device connection manager may also selectively enable the first radio in response to the user equipment leaving a coverage area of the Wi-Fi access point or de-registering from the Wi-Fi communication. The user equipment may then transmit a message over the primary LTE carrier in a licensed frequency band to the base station requesting activation of one or more secondary unlicensed LTE carriers and indicating that communication according to the first radio access technology in the unlicensed spectrum (LTE-U) has been enabled or activated on the user equipment. In some embodiments, if the user equipment is engaged in LTE-U SDL transmissions with the base station, the device connection manager can power down the Wi-Fi radio that is operating in the same unlicensed frequency band to prevent interference. Some embodiments of the device connection manager not power down Wi-Fi radios that are operating in a different unlicensed frequency band (such as 2.4 GHZ) than the LTE-U radio. In this case, the device connection manager may allow the user equipment to concurrently connect to both Wi-Fi and LTE-U in the different unlicensed frequency bands for additional wireless backhaul throughput.

FIG. 1 is a diagram of a wireless communication system 100 according to some embodiments. The wireless communication system 100 includes one or more base stations 105 that provide wireless connectivity according to a first radio access technology, e.g., according to the Long Term Evolution (LTE) standards defined by the Third Generation Partnership Project (3GPP). The base station 105 may provide uplink or downlink communications over one or more carriers in a licensed frequency band within a geographic area or cell indicated by the dashed oval 110. For example, the base station 105 may provide uplink and downlink communications to user equipment 115 over a carrier 120. The base station 105 may also provide uplink and downlink communications to user equipment 125 over a carrier 130. The carriers 120, 130 may be referred to as LTE licensed (LTE-L) carriers.

The base station 105 also supports supplemental downlink communication within a geographic area or cell indicated by the dotted oval 135. Some embodiments of the base station 105 may support up to two unlicensed secondary carriers and may establish LTE-U SDL operation with any LTE-U capable user equipment 115, 125 within its coverage area. The base station 105 may support one or more carriers 140, 145 to provide downlink signals to user equipment 115, 125 in unlicensed frequency bands such as the Unlicensed National Information Infrastructure (UNII), which is formed of portions of the radio spectrum that include frequency bands in the range of 5.15 GHz to 5.825 GHz such as the U-NII-1 band in the range 5.15-5.25 GHz, the U-NII 2a, b, c bands in the range 5.25-5.725 GHz, and the U-NII 3 band in the range 5.725-5.825 GHz. The licensed cell 110 (which may also be referred to as the primary cell or Pcell) may cover substantially the same area as the unlicensed cell 135 (which may also be referred to as the secondary or supplemental cell or Scell). However, in some embodiments, the licensed cell 110 may only partially overlap the unlicensed cell 135. Although a single base station 105 is depicted in FIG. 1, in some embodiments, different base stations may provide the primary carrier used to provide connectivity within the licensed cell 110 and the supplemental carrier used to provide connectivity within the unlicensed cell 135.

The LTE-U secondary carriers may each use a 20 MHZ channel in the unlicensed spectrum, and if two such LTE-U carriers are employed by the base station 105, the LTE-U secondary carriers use adjacent 20 MHZ channels and are collocated in the same unlicensed frequency band such as UNII-1 or UNII-3. Some embodiments of the user equipment 115, 125 may notify the base station 105 that they intend to power down (or have already powered down) their LTE-U radios. The notification may indicate a request for the deactivation of the secondary LTE-U carrier. For example, the user equipment 115 may notify the base station 105 that intends to power down its LTE-U radio. Subsequent to receiving the notification, the base station 105 may no longer attempt to perform LTE-U SDL operation with the user equipment 115 until the user equipment 115 sends a request to reactivate the secondary LTE-U carrier. However, the base station may perform LTE-U SDL operation with the user equipment 125 using the LTE-U carrier that has been deactivated for the user equipment 115.

The wireless communication system 100 also includes one or more access points 150 that provide wireless connectivity in the unlicensed frequency band according to a second radio access technology, e.g., according to the Wi-Fi standards. Some embodiments of the access point 150 transmit or receive signals or messages over one or more carriers 155 in the unlicensed frequency band. For example, the access point 150 may transmit or receive messages using one or more carriers in one or more of the frequency bands in the UNII range of 5.15 GHz to 5.825 GHz. The access point 155 may transmit signals or messages to user equipment 115 or receive messages from the user equipment 115 as long as the user equipment 115 is within the cell (indicated by the dotted oval 160) covered by the access point 150. As used herein, the phrase "within the cell" indicates that the user equipment 115 detects signals (such as pilot signals or beacon signals) transmitted by the access point 150 having a signal strength above a threshold value that indicates that the user equipment 115 is within the coverage area 160 of the access point 150. For example, the user equipment 115 may detect signals transmitted by the access 150 in the unlicensed frequency band. The user equipment 115 may be outside of the cell 160 if the user equipment 115 fails to detect the expected signals or detects the expected signals at a signal strength below the threshold value. Although not explicitly shown in FIG. 1, some embodiments of the base station 105 may also implement functionality (such as one or more additional radios) to provide wireless connectivity according to the second radio access technology.

User equipment 115 is located in a portion of the cell 135 that overlaps with a portion of the cell 160. As used herein, the phrase "overlap" is understood to indicate that at least a portion of the frequency band used by the carrier 140 is the same as at least a portion of the frequency band used by the carrier 155. For example, the carrier 140 and the carrier 155 may both use the U-NII 3 band in the range 5.725-5.825 GHz. Downlink signals received from the base station 105 over the supplemental downlink carrier 140 may therefore collide with downlink signals received on downlink channels of the carrier 155 if the frequency bands used by the carriers 140, 155 overlap. Furthermore, in some embodiments of the user equipment 115, the transmission and reception paths in the radios in the user equipment 115 that operate according to the first and second radio access technologies may not be isolated from each other to the degree required for concurrent communication over the carriers 140, 155 in overlapping unlicensed frequency bands. For example, the radios in the user equipment 115 may not satisfy the isolation requirement of −48 dBm.

At least in part to prevent collisions between signals and avoid the isolation requirement, the user equipment 115 is able to selectively activate, deactivate, or reactivate one or more of the carriers 140, 155 that operate in overlapping unlicensed frequency bands. For example, the user equipment 115 may deactivate the carrier 140 in response to detecting the access point 150, which may be detected on the basis of the strengths of signals such as pilot signals or beacon signals received by the user equipment 115 or other signals received in the unlicensed frequency band. The user equipment 115 may notify the base station 105 that the carrier 140 has been deactivated by transmitting a notification using the carrier 120 in the licensed frequency band. The user equipment 115 may subsequently reactivate the carrier 140 in response to the user equipment 115 moving out of the cell 160 or in response to user input that deactivates the carrier 155 or disconnects the user equipment 115 from the access point 150.

Figure 2:
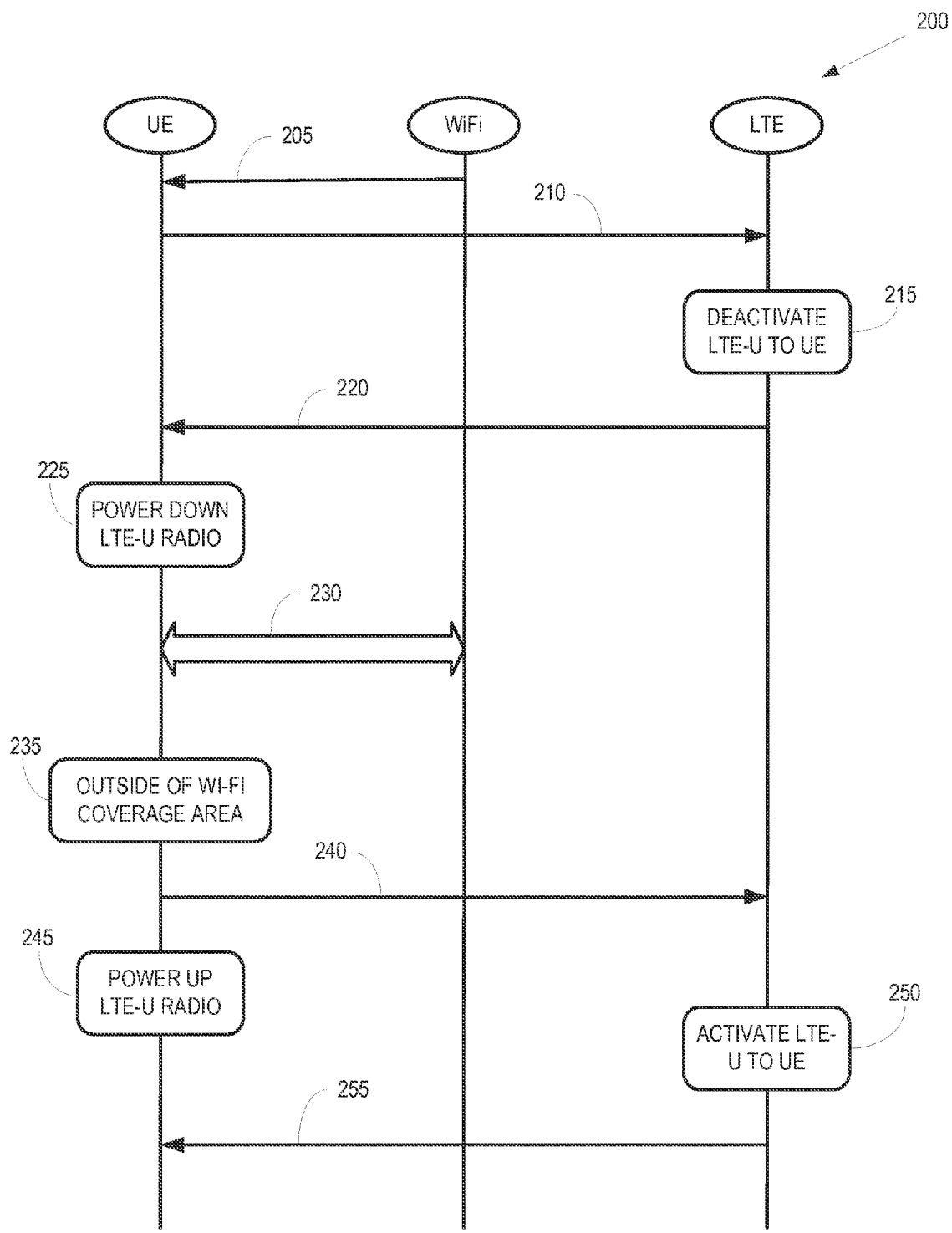
FIG. 2 is a flow diagram of a method for selectively activating or deactivating carriers in unlicensed frequency band according to some embodiments.

FIG. 2 is a flow diagram of a method 200 for selectively activating or deactivating carriers in unlicensed frequency band according to some embodiments. The method 200 illustrates actions performed by user equipment (UE), a base station that operates according to a first (LTE) radio access technology, and an access point that operates according to a second (Wi-Fi) radio access technology, as well as signals or messages that are exchanged between these entities. The method 200 may therefore be implemented in some embodiments of the user equipment 115, the base station 105, or the access point 150 shown in FIG. 1. In the illustrated embodiment, the user equipment has an ongoing communication session with the LTE base station over one or more LTE-L carriers in a licensed frequency band, which may be used for transmitting control signals or data signals over the uplink or downlink. The user equipment is also able to communicate with the LTE base station over one or more LTE-U carriers in an unlicensed frequency band, such as one of the frequency bands of the U-NII.

In the illustrated embodiment, the unlicensed frequency bands used by the one or more LTE-U carriers overlap with the unlicensed frequency bands used by one or more Wi-Fi carriers. The user equipment may therefore selectively activate or deactivate LTE-U carriers in response to detecting a Wi-Fi access point. The Wi-Fi access point may be a user preferred Wi-Fi access point that has been selected by the user. Some embodiments of the Wi-Fi access point transmit (at 205) a signal such as a pilot signal, a beacon signal, or other signals transmitted in the unlicensed frequency band by the Wi-Fi access point. The user equipment then detects the presence of the access point on the basis of the signal 205. For example, the user equipment may determine that the received signal strength of the signal is above a threshold value indicating that the user equipment is within the coverage area of the access point. The user equipment may have an ongoing communication session with the LTE base station over one or more LTE-U carriers in the unlicensed frequency band. In that case, signals from the access point may be detected by scanning the unlicensed frequency band for signals during a time interval in which the LTE base station is not transmitting downlink signals in the unlicensed frequency band, as discussed herein.

At 210, the user equipment transmits a signal or message to notify the LTE base station that the user equipment has detected the access point and is going to (or already has) deactivate the one or more LTE-U carriers in the unlicensed frequency band. For example, the user equipment may transmit a radio resource control (RRC) message or a media access control (MAC) element that indicates deactivation of the one or more LTE-U carriers. In response to receiving the signal or message from the user equipment, the LTE base station deactivates (at 215) communication with the user equipment over the one or more LTE-U carriers in the unlicensed frequency band. For example, the LTE base station may deactivate (at 215) supplemental downlink channels that are aggregated with communication channels in the licensed frequency band. Deactivation may be performed on a per-user basis so that supplemental downlink channels to other user equipment are not affected by deactivation of the supplemental downlink channel to the user equipment illustrated in FIG. 2. At 220, the LTE base station may transmit a response or confirmation that the LTE-U carriers in the unlicensed frequency band have been deactivated.

The user equipment deactivates the one or more LTE-U carriers in the unlicensed frequency band at 225. For example, the user equipment may deactivate the one or more LTE-U carriers by powering down a corresponding LTE-U radio. In the illustrated embodiment, the user equipment deactivates the LTE-U carriers in response to receiving the response or confirmation from the LTE base station at 220. However, some embodiments of the user equipment may perform the actions 210, 215, 220, 225 in a different order than the order depicted in FIG. 2. For example, the user equipment may deactivate (at 225) the one or more LTE-U carriers prior to transmitting the notification 210, concurrently with transmitting a notification 210, concurrently with deactivation of the one or more LTE-U carriers by the LTE base station at 215, or concurrently with transmission of the response or confirmation at 220. Some embodiments of the user equipment may delay deactivation of the LTE-U carriers until the LTE base station completes previously scheduled communications over the LTE-U carriers in the unlicensed frequency band. At 230, the one or more LTE-U carriers used for communication with the LTE base station in the unlicensed frequency band have been deactivated and the user equipment may communicate with the Wi-Fi access point by exchanging messages or signals over one or more Wi-Fi carriers in the unlicensed frequency band.

The user equipment may subsequently reactivate the one or more LTE-U carriers to communicate with the LTE base station in the unlicensed frequency band. At 235, the user equipment determines that it is outside of a coverage area of the Wi-Fi access point. For example, the user equipment may fail to detect a signal such as a pilot signal, beacon signal, or other signal in the unlicensed frequency band from the Wi-Fi access point. For another example, the user equipment may detect the signal at a signal strength that is below a threshold corresponding to the Wi-Fi coverage area. For yet another example, a user may input a signal to the user equipment to manually override selection of the Wi-Fi access point. The user equipment may then disconnect from the Wi-Fi access point, deactivate the Wi-Fi carrier, or power down a Wi-Fi radio used to communicate with the Wi-Fi access point.

At 240, the user equipment transmits the message or signal to the LTE base station using an LTE-L carrier in the licensed frequency band. The method or signal notifies the LTE base station that the user equipment is reactivating (or already has reactivated) the one or more LTE-U carriers in the unlicensed frequency band. The user equipment reactivates the one or more LTE-U carriers in the unlicensed frequency, e.g., by powering up the LTE-U radio at 245. The LTE base station activates (at 250) the one or more LTE carriers in the unlicensed frequency band in response to receiving the notification from the user equipment at 245. Some embodiments of the user equipment may power up the LTE-U radio prior to transmitting the notification 240, concurrently with transmitting the notification 240, or concurrently with the LTE base station reactivating the one or more LTE-U carriers. The LTE base station may then transmit (at 255) messages or signals to the user equipment over the one or more LTE-U carriers in the unlicensed frequency band.

Figure 3:
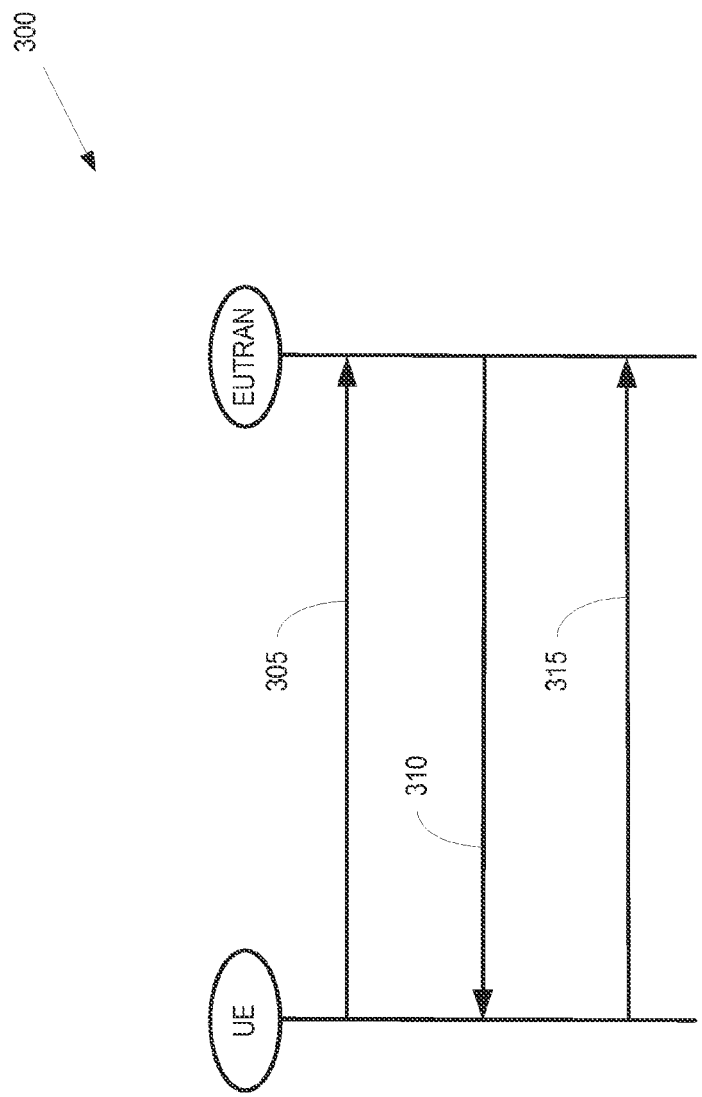
FIG. 3 is a flow diagram of a method of notifying a base station that user equipment is deactivating one or more carriers in an unlicensed frequency band according to some embodiments.

FIG. 3 is a flow diagram of a method 300 of notifying a base station that user equipment is deactivating one or more carriers in an unlicensed frequency band according to some embodiments. Some embodiments of the base station may be an eNodeB in an evolved universal mobile telecommunication system terrestrial radio access network (EUTRAN) that operates according to LTE. The method 300 may be implemented in some embodiments of the user equipment 115, 125 or the base station 105 shown in FIG. 1. Some embodiments of the method 300 utilize RRC signaling messages or a MAC element transmitted between the user equipment and the eNodeB to allow the user equipment to initiate activation or de-activation of the one or more carriers in the unlicensed frequency band on the eNodeB in response to activating, deactivating, or reactivating the LTE-U carriers on the user equipment. As discussed herein, the LTE-U radios may be completely powered down when LTE-U carriers are deactivated on the user equipment. Providing the notification allows the eNodeB to know when the user equipment may not be able to participate in LTE-U related operations such as performing a channel scan and the like. Performance of the eNodeB may therefore be optimized so that the eNodeB does not waste processing resources trying to establish LTE-U operation with user equipment that may have unilaterally turned off its LTE-U radios without notifying the eNodeB. The user equipment may also be able to conserve battery power by powering down the LTE-U radios.

At 305, the user equipment transmits a message to the eNodeB to indicate that the user equipment is deactivating (or already has deactivated) one or more LTE carriers in the unlicensed frequency band. Some embodiments of the user equipment may transmit (at 305) an RRC request to indicate deactivation of the one or more LTE carriers. For example, the RRC request may be transmitted prior to transmitting a conventional RRCconnectionReconfiguration message in the same way that user equipment may transmit an RRC connection re-establishment request message. Some embodiments of the user equipment may transmit (at 305) a MAC element to indicate deactivation of the one or more LTE carriers. For example, the MAC elements may be transmitted in one or more of the reserved bits in the table of LCID shown below.

| Index | LCID values |
|---|---|
| 00000 | CCCH |
| 00001- | Identity of the logical |
| 01010 | channel |
| 01011- | Reserved |
| 11001 | |
| 11010 | Power Headroom Report |
| 11011 | C-RNTI |
| 11100 | Truncated BSR |
| 11101 | Short BSR |
| 11110 | Long BSR |
| 11111 | Padding |

In response to receiving the message 305, the eNodeB may deactivate the one or more LTE-U carriers for the user equipment and provide a response or confirmation to the user equipment at 310. The user equipment may then complete deactivation of the one or more user equipment (e.g., by powering down the LTE-U radio) and provide (at 315) a message indicating that reconfiguration of the RRC connection is complete.

The user equipment may configure the one or more LTE-U carriers for communication in the unlicensed frequency band in one or more geographic areas that may be referred to as Scells. The user equipment may also configure one or more LTE-L carriers for communication in the licensed frequency band in a geographic area that may be referred to as a Pcell. In some embodiments, the network may activate or deactivate the configured SCells, e.g., in response to the message 305 indicating that the user equipment has deactivated one or more corresponding LTE-U carriers. The unlicensed frequency bands that are used to provide service in the Scells may be activated or deactivated independently of licensed frequency bands used to provide service in the Pcells. For example, the PCell may remain activated even though one or more corresponding SCells have been deactivated so that the user equipment and the eNodeB may exchange control signals or data signals using one or more LTE-L carriers in the licensed frequency band. In some embodiments, the network activates and deactivates the SCell(s) by sending the Activation/Deactivation MAC control element described in sub-clause 6.1.3.8 of 3GPP TS 36.321. The configured SCells may be deactivated upon addition or after a handover. Moreover, in some embodiments, an additional deactivation criterion may be applied, e.g., the configured Scells may be deactivated based on:

unlicensed frequency band. The LTE carriers 520, 525 may be aggregated to increase the total bandwidth provided by the LTE base station 505. The LTE base station 505 also includes a processor 530 and a memory 535. The processor 530 may be used to execute instructions stored in the memory 535 and to store information in the memory 535 such as the results of the executed instructions. Some embodiments of the processor 530 and the memory 535 may be configured to perform portions of the method 200 shown in FIG. 2.

The communication system 500 includes user equipment 540. The user equipment 540 includes a transceiver 545 for transmitting and receiving signals via antenna 550. Some embodiments of the transceiver 545 include multiple radios for communicating according to different radio access technologies such as a Wi-Fi radio 555, a radio 560 for commu-

```
1. MAC-CE messages, or
2. Using the RRC Connection Reconfiguration RRC messages:
RRCConnectionReconfiguration-v1020-IEs ::= SEQUENCE {
    sCellToReleaseList-r10      SCellToReleaseList-r10                    OPTIONAL,  -- Need ON
    sCellToAddModList-r10       SCellToAddModList-r10                     OPTIONAL,  -- Need ON
    nonCriticalExtension        RRCConnectionReconfiguration-v11xx-IEs    OPTIONAL
```

Figure 4:
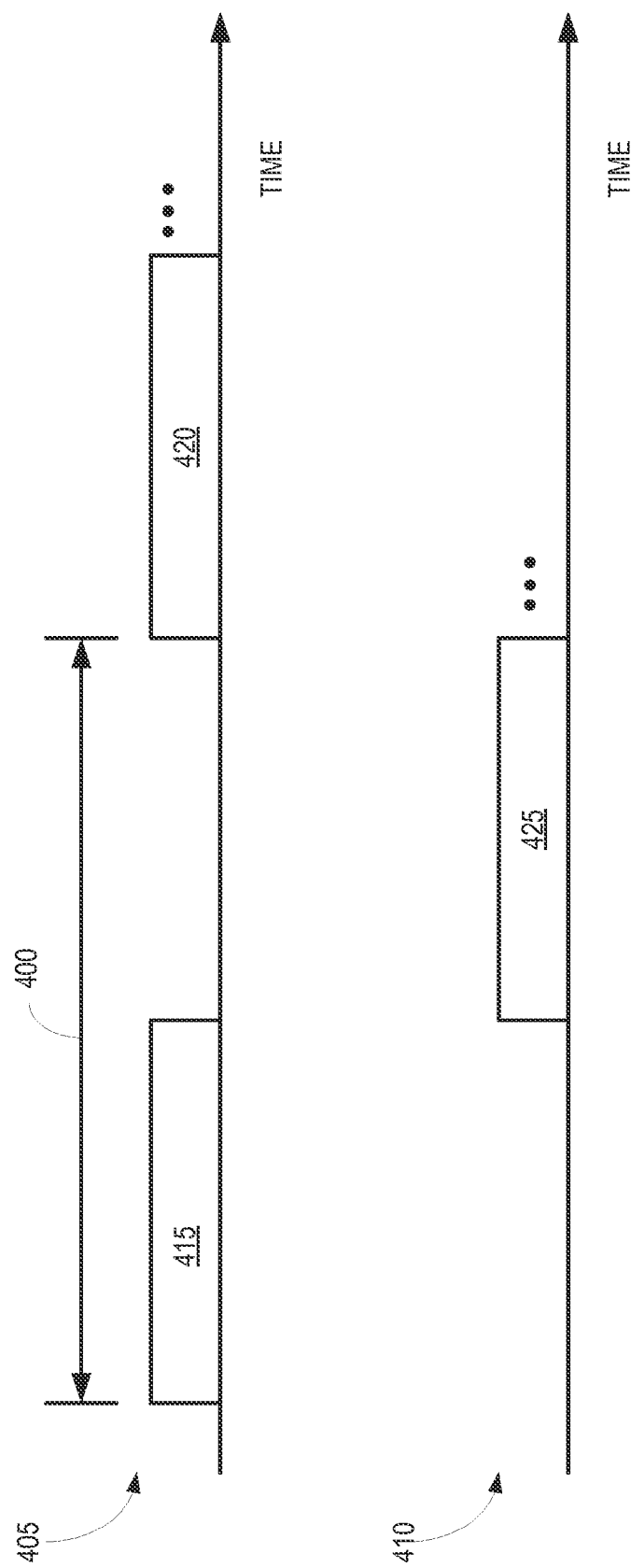
FIG. 4 is a diagram showing a set of allocations of time intervals in a gating cycle for downlink transmissions by a base station on two channels of an unlicensed frequency band according to some embodiments.

FIG. 4 is a diagram showing a set of allocations of time intervals in a gating cycle 400 for downlink transmissions by a base station on two channels of an unlicensed frequency band according to some embodiments. The gating cycle 400 may be used by some embodiments of the base station 105 for downlink transmissions to the user equipment 115, 125 (shown in FIG. 1) on one or more LTE-U carriers of the unlicensed frequency band. The gating cycle 400 may repeat indefinitely or for a predetermined amount of time. A first allocation 405 indicates time intervals in the gating cycle 400 that are allocated to a first channel and a second allocation 410 indicates time intervals in the gating cycle 400 that are allocated to a second channel. The horizontal axes indicate time increasing from left to right.

The user equipment that receives downlink transmissions on the LTE carriers of the unlicensed frequency band in the time intervals 415, 420 may scan for the presence of a Wi-Fi access point during the unoccupied portion of the gating cycle 400. For example, the user equipment may scan for transmissions in the unlicensed frequency band by the Wi-Fi access point during the unoccupied portion of the gating cycle 400. Other user equipment that receive downlink transmissions on the LTE carriers of the unlicensed frequency band in the time interval 425 may scan for the presence of the Wi-Fi access point during the complementary unoccupied portions of the gating cycle 400. Thus, the user equipment may be able to detect the presence of Wi-Fi access points (e.g., by detecting pilot signals, beacon signals, or other signals in the unlicensed frequency band) without reducing the time intervals 415, 420, 425 that are used for downlink transmissions such as supplemental downlink communication with an LTE base station.

Figure 5:
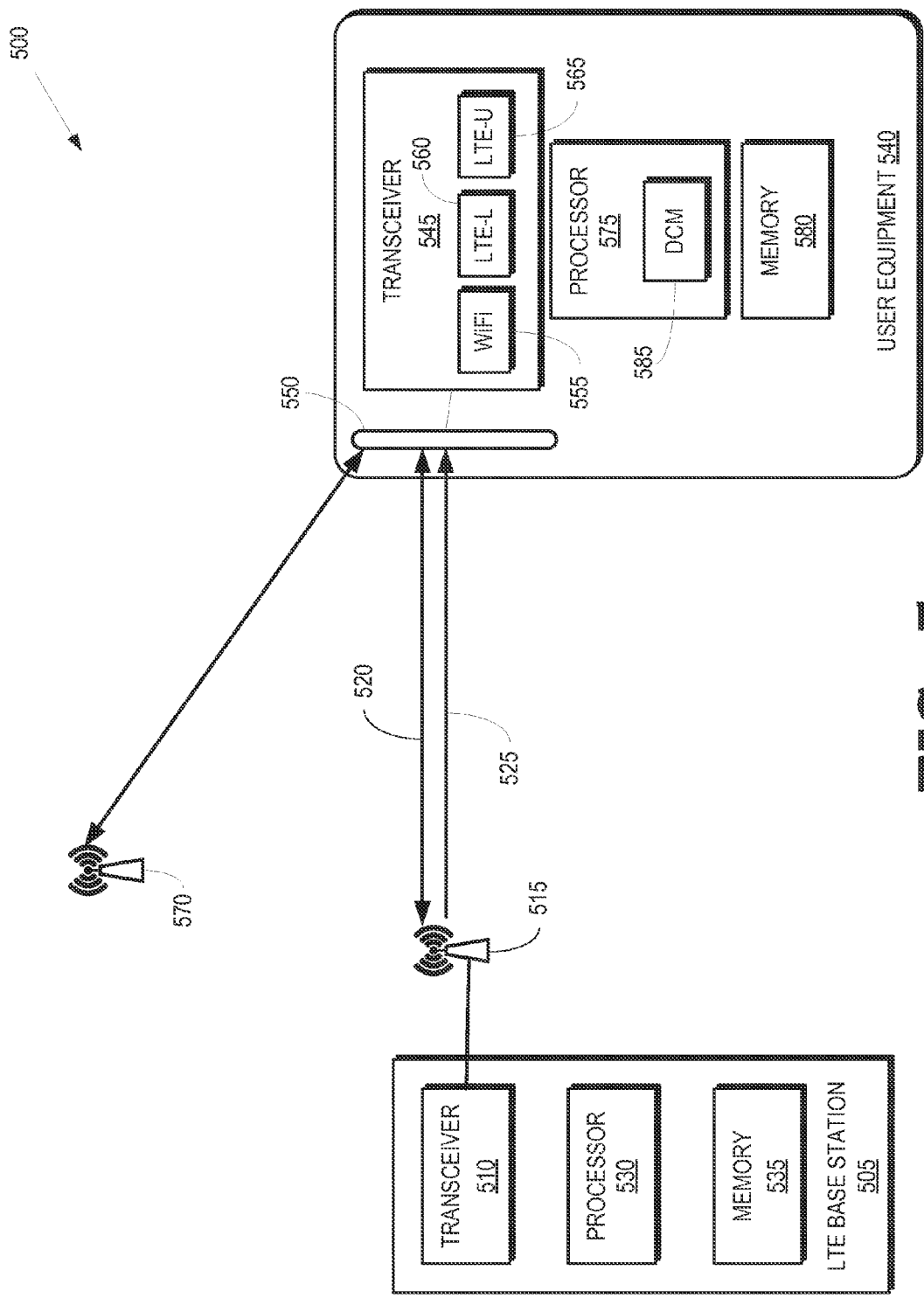
FIG. 5 is a block diagram of a wireless communication system according to some embodiments.

FIG. 5 is a block diagram of a communication system 500 according to some embodiments. The communication system 500 includes a base station 505 that operates according to a first radio access technology, such as an LTE base station 505. Some embodiments of the LTE base station 505 may be used to implement the base station 105 shown in FIG. 1. The LTE base station 505 includes a transceiver 510 for transmitting and receiving signals using one or more antennas 515. The signals may include uplink or downlink signals transmitted over an LTE-L carrier 520 in a licensed frequency band and downlink signals transmitted over an LTE-U carrier 525 in an nication in licensed LTE frequency bands (LTE-L), and a radio 565 for communication in unlicensed LTE frequency bands (LTE-U). For example, the LTE-L radio 560 in the user equipment 540 may communicate with the LTE base station 505 using the LTE-L carriers 520 in the licensed frequency band. The LTE-U radio 565 in the user equipment 540 may communicate with the LTE base station 505 using the LTE-U carriers 525 in the unlicensed frequency band. The user equipment 540 may also communicate with an access point that operates according to a second radio access technology, such as a Wi-Fi access point 570, using the Wi-Fi radio 555 in the user equipment 540.

The user equipment 540 also includes a processor 575 and a memory 580. The processor 575 may be used to execute instructions stored in the memory 580 and to store information in the memory 580 such as the results of the executed instructions. Some embodiments of the processor 575 and the memory 580 may be configured to perform portions of the method 200 shown in FIG. 2. For example, the processor 575 may implement a device connection manager (DCM) 585 the controlled operation of the transceiver 545 and the radios 555, 560, 565. The DCM 585 may selectively activate, deactivate, or reactivate one or more of the radios 555, 565 that operate in the unlicensed frequency band, as discussed herein. Some embodiments of the DCM 585 may perform the selective activation, deactivation, or reactivation in response to the user equipment 540 registering for access to the Wi-Fi access point 570 or based on previously stored authentication information associated with the Wi-Fi access point 570 or the LTE base station 505.

Some embodiments of the DCM 585 may allow the Wi-Fi radio 555 and the LTE-U radio 565 to operate concurrently if the DCM 585 detects enough operating frequency separation between the two radio access technology so that concurrent transmissions on the radios 555, 565 do not result in receiver de-sense. For example, the DCM 585 allow the Wi-Fi radio 555 and the LTE-U radio 565 to operate concurrently if one radio access technology (e.g., Wi-Fi) operates in the upper part of the 5 GHZ band and the other radio access technology (e.g., LTE) operates in the lower part of the 5 GHZ band. In this case the frequency separation of UNII-2b may be deemed sufficient for concurrent operation of both radio access technologies on the user equipment 540. If the user equipment 540 is operating in LTE-U mode, the DCM 585 may not allow Wi-Fi operation in the same frequency band where LTE-U is deployed. In this scenario, the Wi-Fi radio 555 can scan for Wi-Fi presence in the same frequency band only during an LTE-U OFF period of a gating cycle such as the gating cycle 400 shown in FIG. 4. If a Wi-Fi access point (such as a user preferred Wi-Fi access point) is detected, then the LTE-U radio 565 may be deactivated on the user equipment 540 and a Wi-Fi connection with the Wi-Fi access point may be established using the Wi-Fi radio 555.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. An apparatus, comprising:
a first radio for wireless communication over a first carrier in an unlicensed frequency band according to a first radio access technology;
a second radio for wireless communication over a second carrier in the unlicensed frequency band according to a second radio access technology; wherein the first radio is configured to receive signals in the unlicensed frequency band according to the first radio access technology during a first time interval of a gating cycle, and wherein the second radio is configured to scan for signals from an access point in the unlicensed frequency band during a second time interval of the gating cycle, and wherein the second radio is configured to detect the access point by detecting a signal from the access point in the unlicensed frequency band that has a signal strength above a threshold, and
a device connection manager to deactivate the first carrier in response to detecting the access point in the unlicensed frequency band that operates according to the second radio access technology.

2. The apparatus of claim 1, wherein the device connection manager is configured to deactivate the first carrier by powering down the first radio in response to detecting the access point in the unlicensed frequency band.

3. The apparatus of claim 1, wherein the device connection manager is configured to reactivate the first carrier in response to leaving a coverage area of the access point.

4. The apparatus of claim 3, wherein the second radio is configured to determine that the apparatus has left the coverage area of the access point by failing to detect a signal from the access point or detecting a signal from the access point that has a signal strength below a threshold.

5. The apparatus of claim wherein 1, the device connection manager is configured to reactivate the first carrier in response to user input that disconnects the second radio from the access point.

6. The apparatus of claim 5, further comprising:
a third radio configured to transmit a reactivation signal in a licensed frequency band in response to the device connection manager reactivating the first carrier in the unlicensed frequency band.

7. An apparatus, comprising:
a first radio for wireless communication over a first carrier in an unlicensed frequency band according to a first radio access technology;
a second radio for wireless communication over a second carrier in the unlicensed frequency band according to a second radio access technology;
a device connection manager to deactivate the first carrier in response to detecting an access point in the unlicensed frequency band that operates according to the second radio access technology; and a third radio for wireless communication in a licensed frequency band according to the first radio access technology, wherein the third radio is configured to transmit a notification in the licensed frequency band in response to the device connection manager deactivating the first carrier.

8. The apparatus of claim 7, wherein the third radio is configured to transmit a reactivation signal in the licensed frequency band in response to the device connection manager reactivating the first carrier in the unlicensed frequency band.

9. A method comprising:
deactivating a first carrier used by a first radio in user equipment for wireless communication in an unlicensed frequency band according to a first radio access technology in response to detecting an access point that operates according to a second radio access technology used by a second radio in the user equipment for wireless communication in the unlicensed frequency band;
receiving, at the first radio, signals in the unlicensed frequency band according to the first radio access technology during a first time interval of a gating cycle; and
scanning for signals from the access point in the unlicensed frequency band using the second radio during a second time interval of the gating cycle.

10. The method of claim 9, wherein detecting the access point comprises detecting a signal from the access point in the unlicensed frequency band that has a signal strength above a threshold.

11. The method of claim 9, wherein deactivating the first carrier comprises powering down the first radio in response to detecting the access point in the unlicensed frequency band.

12. The method of claim 9, further comprising:
reactivating the first carrier in response to leaving a coverage area of the access point.

13. The method of claim 12, further comprising:
determining that the user equipment has left the coverage area of the access point by failing to detect a signal from the access point or detecting the signal from the access point in the unlicensed frequency band that has a signal strength below a threshold.

14. The method of claim 9, further comprising:
reactivating the first carrier in response to user input that disconnects the second radio from the access point.

15. The method of claim 14, further comprising:
transmitting a reactivation signal in a licensed frequency band in response to reactivating the first carrier.

16. The method of claim 9, further comprising:
reactivating the first carrier; and
transmitting a reactivation signal in a licensed frequency band in response to reactivating the first carrier.

17. A method comprising:
deactivating a first carrier used by a first radio in user equipment for wireless communication in an unlicensed frequency band according to a first radio access technology in response to detecting an access point that operates according to a second radio access technology used by a second radio in the user equipment for wireless communication in the unlicensed frequency band, and
transmitting, from a third radio in a licensed frequency band according to the first radio access technology, a notification in response to deactivating the first carrier.

18. The method of claim 17, further comprising:
reactivating the first carrier; and
transmitting, from the third radio, a reactivation signal in the licensed frequency band in response to reactivating the first carrier.

19. An apparatus, comprising:
a transceiver to receive a notification transmitted by user equipment in a licensed frequency band according to a first radio access technology, wherein the notification indicates that the user equipment is deactivating a carrier for receiving downlink signals in an unlicensed frequency band according to the first radio access technology; and
a processor to bypass transmission of downlink signals to the user equipment on the carrier in the unlicensed frequency band in response to receiving the notification.

20. The apparatus of claim 19, wherein the transceiver is configured to receive the notification in response to the user equipment detecting an access point that operates according to a second radio access technology in the unlicensed frequency band.

21. The apparatus of claim 19, wherein the transceiver is configured to transmit a response indicating that the processor is bypassing transmission of downlink signals to the user equipment on the carrier in the unlicensed frequency band.

22. The apparatus of claim 19, wherein the processor is configured to resume transmission of downlink signals to the user equipment on the carrier in the unlicensed frequency band in response to receiving a notification indicating that the user equipment has reactivated the radio.

* * * * *